March 24, 1953 G. USTIN 2,632,788

ROCKET CONNECTOR ASSEMBLY

Filed Aug. 16, 1951

INVENTOR
George Ustin
BY
ATTORNEY

Patented Mar. 24, 1953

2,632,788

UNITED STATES PATENT OFFICE 2,632,788

ROCKET CONNECTOR ASSEMBLY

George Ustin, Palisades Park, N. J., assignor to Continental Copper & Steel Industries, Inc., New York, N. Y., a corporation of Delaware Application August 16, 1951, Serial No. 242,075

1 Claim. (Cl. 173—361)

The present invention relates to a rocket connector assembly, and it particularly relates to a rocket connector assembly for electric wiring connections in connection with rockets used on aircraft and in other connections.

It is among the objects of the present invention to provide a simple, readily manufactured, inexpensive rocket connector assembly capable of widespread use, in which the electrical connections may be readily maintained to the rocket and which at the same time will readily permit ejection or discharge of said rocket with ready breakage of the electrical connection.

In the firing of rockets from aircraft it has been found necessary to provide a reliable assembly, and particularly a reliable rocket connector assembly which may be readily manufactured in large mass production quantities and readily installed, with assurance that the electrical circuits in the detachable rocket member will be fully in connection and firmly connected with the mounting body and which at the same time will permit ready separation and detachment of the projectile or rocket, as the case may be.

A special problem arises in connection with rockets or projectiles carried upon airplane wings, where the rocket is to be speedily and substantially instantaneously separated from its carrier or mounting upon the wing after a suitable electric charge or ignition has been accomplished.

It is therefore among the further objects of the present invention to provide a specific, separable electrical connection particularly adapted for airplane or wing mountings of rockets or other projectiles or even other types of bodies which are to be speedily and instantaneously attached and removed from said wing after an electrical charge or an electrical ignition has been accomplished.

A further object is to provide a separable rocket connector assembly in which the interlock and/or interfitting members, respectively, to be mounted upon the wing and projectile, rocket or other body to be released will be separable without difficulty and at the same time susceptible to large mass production at relatively low cost.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most suitable, according to one embodiment of the present invention, to provide a single enclosing molded plastic element, desirably primarily molded of a suitable insulating plastic material such as styrene, in which is received the breakable or rupturable electrical connections to the rocket.

The rocket connector desirably has an internal shaft forming one pole of a connector encircled by a spaced metal sleeve forming an air gap or by an insulating sleeve of a resinous material, such as a molded phenolic formaldehyde resin sleeve.

The external sleeve of metal or brass forms the other leg of the connector. These two members are embodied or molded in the main plastic or styrene body to give a substantially moisture-proof enclosure with positive contact and no opportunity for electrical shorts.

In the preferred form, the rocket connector or interlock is made integral in one piece with a single enclosing, molded shell. The connecting electrical wiring to the rocket or other projectile and the extension of the enclosing casing is made so that strain or pull will rupture the same releasing the rocket for flight.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views.

Figure 1:
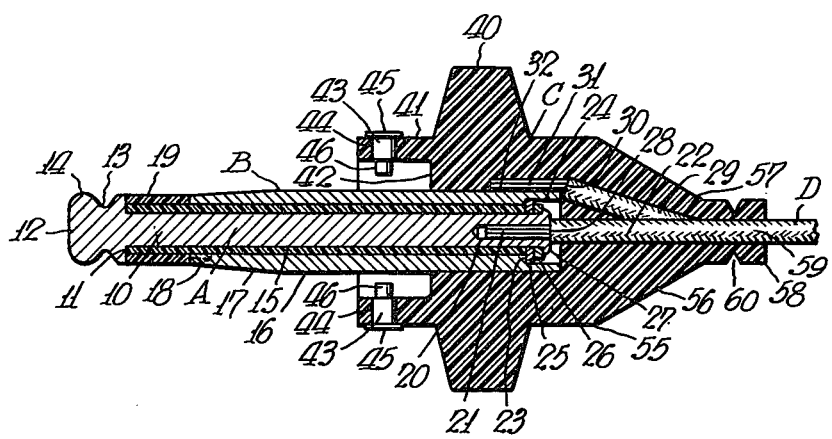
Fig. 1 is a side longitudinal sectional view of a one piece rocket connector assembly according to one preferred embodiment of the present invention with a breakaway connection.

In the embodiment of Fig. 1, the rocket connector assembly has a central shaft A forming one pole of the connector, and a sleeve B forming the other pole of the connector. The body C, which is molded of a styrene resin, is moulded around the ends of the shafts A and B and carries the electrical connections or wires D.

Although the body C is preferably molded around the shafts A and B and the wires or conductors D, it also may be made in two pieces and also may be molded of insulating materials other than styrene resin.

Specifically, the central shaft A has an elongated portion 10 of reduced dimension with an end shoulder 11, having a head 12.

The head 12 has an annular groove or recess 13 with an enlarged end portion 14 performing suitable electrical connection. The molded phenol formaldehyde resin sleeve 15 encircles the reduced diameter portion 10.

Around the sleeve 15 is positioned the tubular member or sleeve B having a cylindrical portion 16 and a conical or convergent portion 17, which terminates at 18.

Between the shoulder 11 of the central member A and the end 18 of the tubular member B is positioned a spacer sleeve 19 which also may be of a molded phenolic resin.

The central inner end portion of the shaft A is recessed as indicated at 20. In the recess 20 are inserted and soldered in position the wires 21 at the end of the central conductor 22.

The outer sleeve or connector member B is also recessed as indicated at 24 with a bottom shoulder 23. Pressed against the bottom shoulder 23 are the washers 25 and 26 which are held downwardly by the peaned over-portion 27 of the inner end of the central member A.

It will be noted that the insulation of the central conductor or wire 22 terminates at 28 just outside of the peaned-over portion 27.

The other wire or conductor 29 has its insulation cut off at 30, and the end wires 31 are soldered at 32 to the outside of the inner portion of the tubular member B.

The molded styrene body C has an enlarged central head portion 40, which has a rearwardly projecting sleeve 41 with a recess 42.

The sleeve 41 receives the rivets or pins 43 which fit in the openings 44. These rivets or pins have enlarged heads 45 and reduced diameter stud portions 46 by which a bayonet connection may be made to a suitable structure upon the airplane wing.

At the same time, the central shaft A and the sleeve B will be inserted in the socket and will meet electrical connection therewith.

The body C also has the forwardly extending portion 55 which tapers as indicated at 56. This body has a recess 57 in which are received the inner ends of the wires or conductors D. The conical portion 56 terminates in a cylindrical sleeve 58 which encircles the two conductors at 59.

Shown in this construction there is a groove or recess 60 forming in the portion 58 which enables ready breakage at such groove or recess 60. If desired, at the ridge or groove 60, the insulation of the conductors D may be partially cut or several of the wires of the central conducting portions may also be cut.

The assembly as shown in Fig. 1 will give a ready break-away while the major portion of the body C will be retained upon the wing structure by the bayonet connection utilizing the pin extensions 46. The electrical connections will be reliably made through the members A and B with their soldered connection to the wires D.

The assemblage shown in Fig. 1 will assure a reliable, firm bayonet connection to the wing structure with assurance of a firm reliable electrical contact with the connector system A—B.

The body C may be injection molded of polystyrene, urea formaldehyde resin, phenol formaldehyde resin or other equivalent plastics which will not crack and which will stand up over wide ranges of temperature and which will firmly retain the system A—B as well as the wires D.

Figure 2:
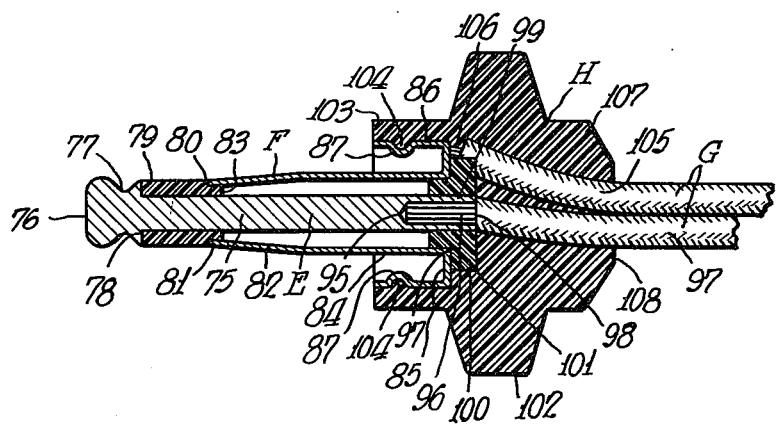
Fig. 2 is a longitudinal sectional view of an alternative form of one-piece rocket connector assembly, which also has a breakaway connection.

In the embodiment of Fig. 2, the central shaft E is encircled by the outer tubular connector F which takes the form of a shell. The shell F, together with the wires or conductors G, are molded in the plastic body H.

As is shown, the shaft E has a reduced dimension portion 75. There is an enlarged head 76 with a groove 77 and a shoulder 78.

Against the shoulder 78 is positioned the plastic sleeve 79 with a recess 80.

The recess 80 receives the end 81 of the conical portion 82 of the outer sleeve F.

The plastic or molded insulating sleeve 79 extends a short distance as indicated at 83 inside of the sleeve F. The sleeve F has a cylindrical portion 84 and it is then turned outwardly as is indicated at 85. It there has a reversely extending sleeve portion 86, The sleeve portion 86 has the dimples or tits 87 which function to provide a bayonet connection as do the members 46 of Fig. 1.

The end of the central shaft is recessed as indicated at 95 to receive the wires 96 which are soldered in position.

The insulation of the central conductor 97 will terminate as indicated at 98.

The sleeve 99, formed by the recess 95, is encircled by the plastic insulating button 100, which has a shoulder 97 receiving the end 85 of the sleeve F.

This button 100 fits in the recess 101 in the molded body H.

The molded body H has an enlarged portion 102 and a rearwardly extending sleeve 103 which extends around the sleeve 86 and fills up the space 104 within the tits of projections 87.

The conductor 105 has its end wires 106 soldered to the sleeve 86 inside of the molded sleeve portion 103. The other side of the plug, as indicated at 107, terminates abruptly as indicated at 108 as compared to the embodiment of Fig. 1, and the portion of the conductors G just beyond the body end 108 may be partly ruptured as to the insulation or wires or both so that there will be a ready break-away connection.

The structure as shown in Figs. 1 and 2 will be readily assembled with the wing structure and the electrical connections thereon and there will be an elimination of electrical shorts and the assembly will be moisture-proof, corrosion resistant and tamper-proof and will lend itself to mass production.

Its operation will not be affected or disrupted upon standing or by an accumulation of dirt, dust, ice or water upon the exterior of the plane structure.

In the embodiments in which strands of wiring of either the conductors D or G are broken, from 6 to 12 out of 26 strands may be ruptured. The washers 55 and 56 like the button or collar 100 are of an insulating material which will electrically separate the inner elements A and E from the outer elements B and F.

This application is a continuation in part of application Serial No. 216,988.

As many changes could be made in the above rocket connector assembly, and many widely different embodiments of this invention could be made without departing from the scope of the claims, it is intended that all matter contained in the above description shall be interpreted as illustrative and not in a limiting sense.

The embodiment of Fig. 1 is shown and described in parent application Ser. No. 216,988 filed March 22, 1951, the present application being particularly directed to the embodiment of Fig. 2.

Having now particularly described and ascertained the nature of the invention, and in what manner the same is to be performed, what is claimed is:

A male connector for engagement with a female connector, comprising an elongated solid conductor member, an enlarged conductor head formed on the outer end of said member, the inner end of said conductor member being formed with a socket, an electric conductor wire secured at one end in said socket, an elongated metallic shell surrounding the conductor member and being spaced therefrom, the outer end of said shell terminating inwardly of the enlarged head on the conductor member, the inner end of the shell terminating forwardly of the inner end of the conductor member, an insulating bushing surrounding the outer end portion of the conductor member and disposed between the enlarged head on the outer end of the conductor member and the outer end of the shell, the inner end portion of the bushing extending into the outer end portion of said shell, a laterally extending flange formed on the inner end of the shell, a second insulating bushing surrounding the exposed inner end portion of the conductor member and abutting the rear face of the flange, said second mentioned bushing having a portion thereof extending into the inner end portion of the shell, a sleeve formed on the outer edge portion of said flange and disposed concentric with the inner end portion of the shell in spaced relation thereto, a second electric conductor wire secured to the lateral flange on said shell, said sleeve being provided with inwardly extending tits to provide a securing means for engagement with the female connector, and a plastic body enclosing the connections of the conductor wires with the conductor member and the shell, and a sleeve-like portion formed on one side of the plastic body for disposition around the sleeve carried by the shell.

GEORGE USTIN.

REFERENCES CITED

The following references are of record in the file of this patent:

UNITED STATES PATENTS

| Number | Name | Date |
| --- | --- | --- |
| 985,241 | Anderson | Feb. 28, 1911 |
| 1,058,032 | Campbell | Apr. 8, 1913 |
| 1,781,958 | Schellenger | Nov. 18, 1930 |
| 1,901,040 | Peroni | Mar. 14, 1933 |
| 2,101,345 | Riley | Dec. 7, 1937 |
| 2,129,044 | Burns | Sept. 6, 1938 |
| 2,163,412 | Schneider | June 20, 1939 |
| 2,254,068 | Frank | Aug. 26, 1941 |
| 2,453,172 | Wilkie | Nov. 9, 1948 |
| 2,498,410 | Gavallet | Feb. 21, 1950 |
| 2,525,414 | Kleinschmidt | Oct. 10, 1950 |
| 2,544,180 | Richards | Mar. 6, 1951 |